United States Patent
Takiyama et al.

(10) Patent No.: US 6,243,108 B1
(45) Date of Patent: Jun. 5, 2001

(54) METHOD AND DEVICE FOR PROCESSING IMAGE DATA BY TRANSFERRING THE DATA BETWEEN MEMORIES

(75) Inventors: Shushi Takiyama; Hitoshi Matsumoto; Satoshi Sonohara, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/248,986

(22) Filed: Feb. 12, 1999

Related U.S. Application Data (62) Division of application No. 08/698,224, filed on Aug. 14, 1996, now abandoned, which is a continuation of application No. 08/435,150, filed on May 5, 1995, now abandoned, which is a continuation of application No. 08/104,653, filed on Aug. 11, 1993, now abandoned.

(51) Int. Cl.[7] .................................................... G06F 13/00
(52) U.S. Cl. .......................................... 345/511; 348/231
(58) Field of Search .................................. 345/501–503, 345/521, 526, 507, 508, 511; 348/207, 222, 231, 232, 233, 239, 714–719

(56) References Cited

U.S. PATENT DOCUMENTS

| | | | |
|---|---|---|---|
| 4,746,993 | 5/1988 | Tada | 386/107 |
| 4,794,468 | 12/1988 | Murakoshi | 386/117 |
| 4,825,324 | 4/1989 | Miyake et al. | 386/120 |
| 5,136,394 | 8/1992 | Haikawa et al. | 386/69 |
| 5,138,503 | 8/1992 | Nishida | 386/120 |
| 5,153,730 | * 10/1992 | Nagasaki et al. | 348/231 |
| 5,164,831 | * 11/1992 | Kuchta et al. | 348/233 |
| 5,195,182 | * 3/1993 | Sasson | 710/53 |
| 5,220,425 | * 6/1993 | Enari et al. | 348/671 |
| 5,253,062 | * 10/1993 | Ohta | 348/714 |
| 5,325,189 | * 6/1994 | Mimura | 348/231 |
| 5,426,731 | * 6/1995 | Masukane et al. | 345/501 |
| 5,469,272 | * 11/1995 | Kubota et al. | 386/75 |
| 5,473,370 | * 12/1995 | Moronaga et al. | 348/231 |
| 5,523,799 | * 6/1996 | Hattori et al. | 348/715 |
| 5,528,194 | * 6/1996 | Ohtani et al. | 348/147 |
| 5,576,757 | * 11/1996 | Roberts et al. | 348/207 |
| 5,604,536 | * 2/1997 | Takaiwa et al. | 348/231 |
| 5,680,175 | * 10/1997 | Yanai et al. | 348/441 |
| 5,686,960 | * 11/1997 | Sussman et al. | 348/218 |
| 5,694,166 | * 12/1997 | Fukushima | 348/231 |

FOREIGN PATENT DOCUMENTS

| | | |
|---|---|---|
| 62-191916 | 8/1987 | (JP) . |
| 62-235687 | 10/1987 | (JP) . |
| 3-177946 | 8/1991 | (JP) . |

* cited by examiner

*Primary Examiner*—Ulka J. Chauhan
(74) *Attorney, Agent, or Firm*—Staas & Halsey LLP (57) ABSTRACT

An image processing method and apparatus includes a controller for an electronic apparatus which displays image data stored in a image memory on a display unit. The controller includes an output unit outputting the image data to be displayed and stored in the image memory to the display unit, a storing controller storing an image data received from an image input device to the image memory, and a transfer unit transferring the image data stored in the image data by the storing controller to a second memory.

14 Claims, 7 Drawing Sheets

FIG. 9 ered, 1995, now abandoned, which was a Continuation of
METHOD AND DEVICE FOR PROCESSING IMAGE DATA BY TRANSFERRING THE DATA BETWEEN MEMORIES This application is a Divisionnal of application Ser. No. 08/698,224 filed Aug. 14, 1996, now abandoned, which is a Continuation of application Ser. No. 08,435,150, filed May 5, 1995, now abandoned, which was a Continuation of application Ser. No. 08/104,653, filed Aug. 11, 1993, now abandoned.

BACKGROUND OF THE INVENTION (1) Field of the Invention

The present invention relates to the method and the device for digitizing image data supplied from an image pick-up device or the like and for recording the same in a predetermined recording media.

(2) Description of the Related Art

An image recording/reproducing device picks up an image of a moving object through a CCD or the like to obtain a dynamic image data consisting of a plurality of frames. The image recording/reroducing device converts the dynamic image data consisting of a plurality of frames from an analog signal to a digital signal to record the same on a storage device such as a magnetic disk device or an optical disk device.

An access speed to a recording media in a storage device has been drastically increased in recent years, which allows an access to the recording media in synchronism with the imaging.

However, the magnetic disk device or the optical disk device currently available offers a high access speed but a shipping may be caused to interrupt the recording processing. Accordingly, the storage device may be hindered to record the frame data into the recording media that are supplied during interruption of processing.

In addition, as image data is created, updated, and deleted, free track pools become fragmented or separated from one another. Thus, the storage device requires a seek-time on storing the image data in the above mentioned recording media. It sometimes becomes impossible to record the image data consisting of a plurality of frames due to the occurrence of the seek-time.

In order to overcome the above mentioned problems, a solution is to temporary store or "buffer" data in a buffer capable of storing data during interruption of access for a few seconds. However, this requires a large amount of memory resources.

Accordingly, the present invention is directed to increasing a buffering capacity with the existing memory resources, thereby effectively carrying out digitizing processing of the image data.

SUMMARY OF THE INVENTION

The present invention is a method for digitizing image data supplied from an image pick-up device or the like and for recording the same in a predetermined recording media. This is a method effective for a buffering of the image data.

The present method is a method for partitioning an internal storing area of the image storing means into at least two image storing regions to carry out digitizing processing for every region.

More particularly, the present method comprises the following procedures:

(1) a determination step for determining, when image data is entered, in which image storing region of the image storing regions it should be stored;

(2) a storing step for storing said image data in the image storing region determined at the determination step;

(3) a digitizing step for digitizing the image data stored at the storing step;

(4) a detection step for detecting from the image storing regions the image storing region into which the image data was stored most previously; and (5) a write-in step for writing in the image data stored in the image storing region detected at the detection step to a predetermined recording media.

In addition, the determination step comprises the steps of judging whether there is an image storing region in the free state among the image storing regions; and determining the image storing region in which said image data should be stored, when there is the image storing region in the free state.

In addition, the write-in step comprises the steps of generating a timing signal at which the image data is written in; and writing in the image data at the time when the timing signal is generated. The timing signal may be generated in synchronism with V-SYNC signal of dynamic image data.

The present invention looks up a state on said image storing means on entering the image data to determine the free space in which the image data should be stored. Subsequently, the present invention stores said image data in said free space.

Then, the present invention detects the image data that was most previously stored and already digitized of the image data stored on the image storing means. This image data is written in to a predetermined recording media.

As mentioned above, the present invention repeats the step of storing the image data in the free space on the image storing means and the step of writing in the image data stored to the recording media.

The image storing means has a few free spaces as long as the image data is correctly processed. The present invention uses these free spaces as the buffer. Accordingly, it is possible to hold the image data on the image storing means for a predetermined time interval even when there is a trouble on the access processing to the storing media of the storage device.

DESCRIPTION OF THE PREFERRED EMBODIMENTS

Preferred embodiments of the present invention are described below.

Embodiment 1

An image processing device according to the present embodiment 1 is a device for realizing a method for processing image according to the present invention.

Figure 1:
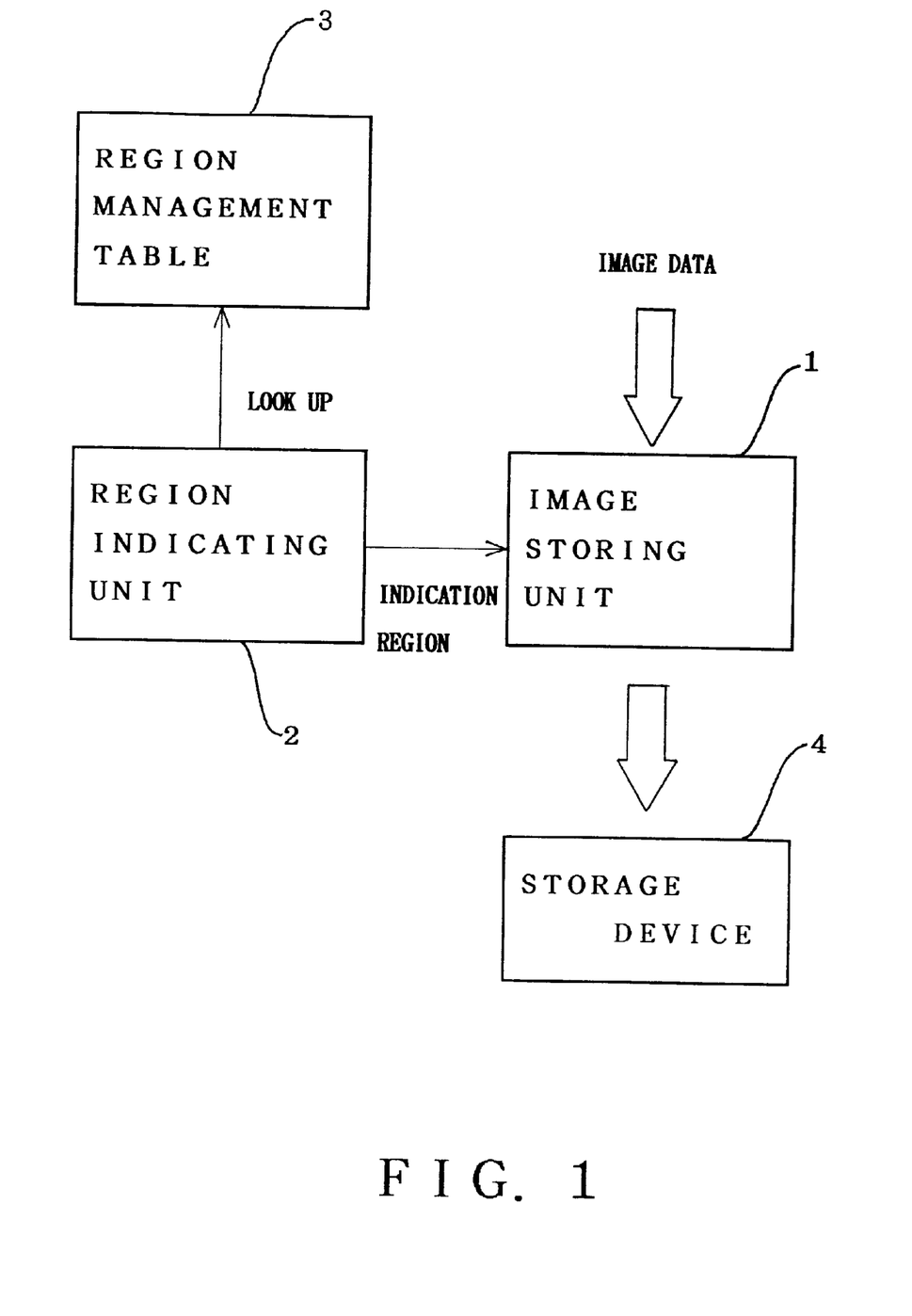
FIG. 1 is a functional block diagram showing a structure of an image processing device according to a first embodiment.

This image processing device is now described in conjunction with FIG. 1.

The image processing device comprises an image storing unit 1 partitioned into at least two image storing regions; a region management table 3 for managing the state of the image storing unit 1; a region indicating unit 2 for determining, by means of looking up the region management table 3, the image storing region in which the image data should be stored as well as indicating the image storing region which the image data should be read out; and an image storage device 4 for recording the image data of the image storing region indicated by said region indicating unit 2 to a predetermined recording media.

Each of the components is described in detail below.

The image storing unit 1 is partitioned into. two or more image storing regions to digitize the image data on each image storing region.

The region management table 3 is a table for managing the state of each image storing region of the image storing unit 1. More particularly, the region management table 3 stores information representing whether each image storing region stores the image data and information representing the order of recording over time in each image storing region.

The region indicating unit 2 judges whether there is a free image storing region among the image storing regions by means of looking up the region management table 3 when the image data is entered the image processing device in question to determine the image storing region in which this image data should be stored.

In addition, the region indicating unit 2 has a function to indicate, by means of looking up the region management table 3, the image storing region that stored the image data most previously and already digitized. The region indicating unit 2 reads out the image data of the indicated image storing region.

The storage device 4 has a function to record the image data read out by the region indicating unit 2 into a predetermined recording media.

The operation of the image processing device is described below.

When image data is supplied through an image pick-up device or the like, the region indicating unit 2 looks up the region management table 3 to judge a free image storing region to determine the image storing region in which this image data should be stored.

The region indicating unit 2 further looks up the region management table 3 to judge the image storing region that stored the image data most previously and already digitized to read out.

The storage device 4 records the image data read out by the region indicating unit 2 into a predetermined recording media.

In this event, the region management table 3 changes the information regarding said image storing region from information representing storing state to information representing free state. In addition, the region management table 3 updates the information representing the order of recording over time in each image storing region.

As a result of this, the image storing unit 1 can serve as a buffer. In other words, the image storing unit 1 can hold the image data for a few seconds when the storage device 4 is troubled.

In addition, to prepare the region indicating unit 2 in the form of a hardware allows continued digitization during file access to the storage device 4 by means of subsequently indicating the free space in the image storing unit 1.

A detailed embodiment of the present invention is described below.

Embodiment 2

Figure 2:
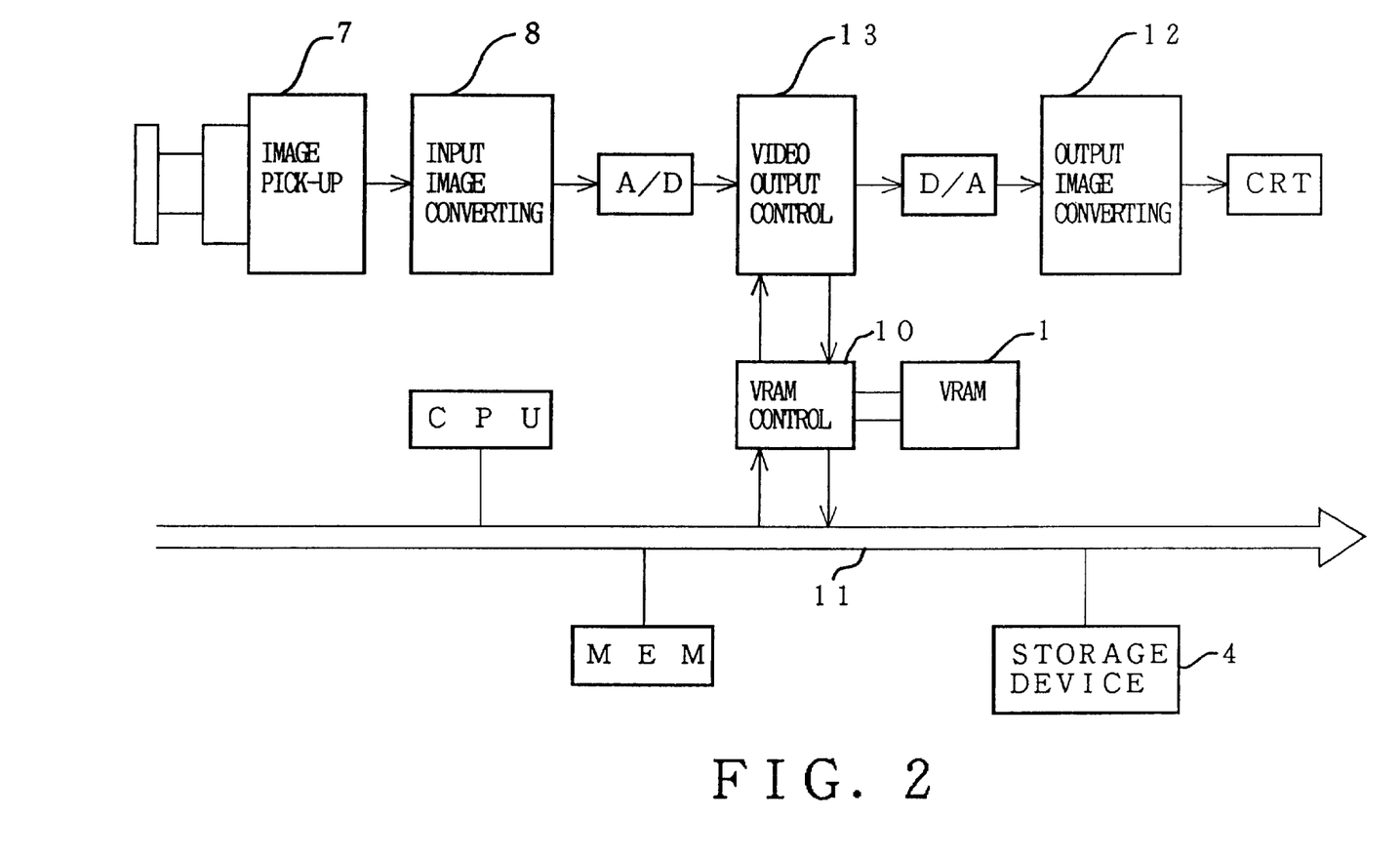
FIG. 2 is a functional block diagram showing a structure of an image processing device according to a second embodiment.

FIG. 2 is a functional block diagram showing an entire structure of an image data processing device according to the embodiment 2.

First, described is an acquisition system for image data.

Image input unit 7 may be a CCD camera or a video reproduction device for public use which produces a video signal (hereinafter referred to as NTSC signal) in the form of an analog signal.

An input image converting unit 8 has a function to convert the NTSC signal supplied from the image input unit 7 into an analog RGB signal.

An A/D converting unit (A/D) has a function to convert the analog RGB signal supplied from the input image converting unit 8 into a digital RGB signal.

A video output control unit 13 has functions to write the image data of the digital RGB signal into an image memory (V-RAM) 1 through a VRAM control unit 10 and to read the same out of the image memory (V-RAM) 1.

In this event, the VRAM control unit 10 is connected to a bus 11 to carry out the following processing under control of a main control unit (CPU):

(1) processing to transfer the image data stored on the image memory (V-RAM) 1 to a main memory (MEM); and (2) processing to transfer the image data stored on the main memory (MEM) to the storage device 4.

An output system for image data is now described.

A D/A converting unit (D/A) has a function to convert the digital RGB signal read out of the image memory (V-RAM) 1 into an analog RGB signal.

An output image converting unit 12 has functions to convert the analog RGB signal supplied from the D/A converting unit (D/A) into the NTSC signal to supply the same to a displaying unit such as a CRT, or to supply the analog RGB signal unconverted to the displaying unit such as a CRT.

Procedures of the digitization processing are described briefly with reference to FIG. 2.

First, the image input unit 7 enters the image data as the NTSC signal. The image input unit 7 supplies this image data to the input image converting unit 8.

The input image converting unit 8 converts the image data in the form of the NTSC signal format into the image data in the form of the analog RGB signal format to supply the same to the A/D converting unit (A/D).

The A/D converting unit (A/D) converts the image data in the form of the analog RGB signal format into the image data in the form of the digital RGB signal format to supply the same to the video output control unit. 13.

The video output control unit 13 writes the image data in the form of the digital RGB signal format into the image memory (V-RAM) 1 through the VRAM control unit 10. The image data written in the image memory (V-RAM) 1 is read out by the VRAM control unit 10 and written in to the storage device 4 such as a magnetic disk. device through the bus 11.

Figure 3:
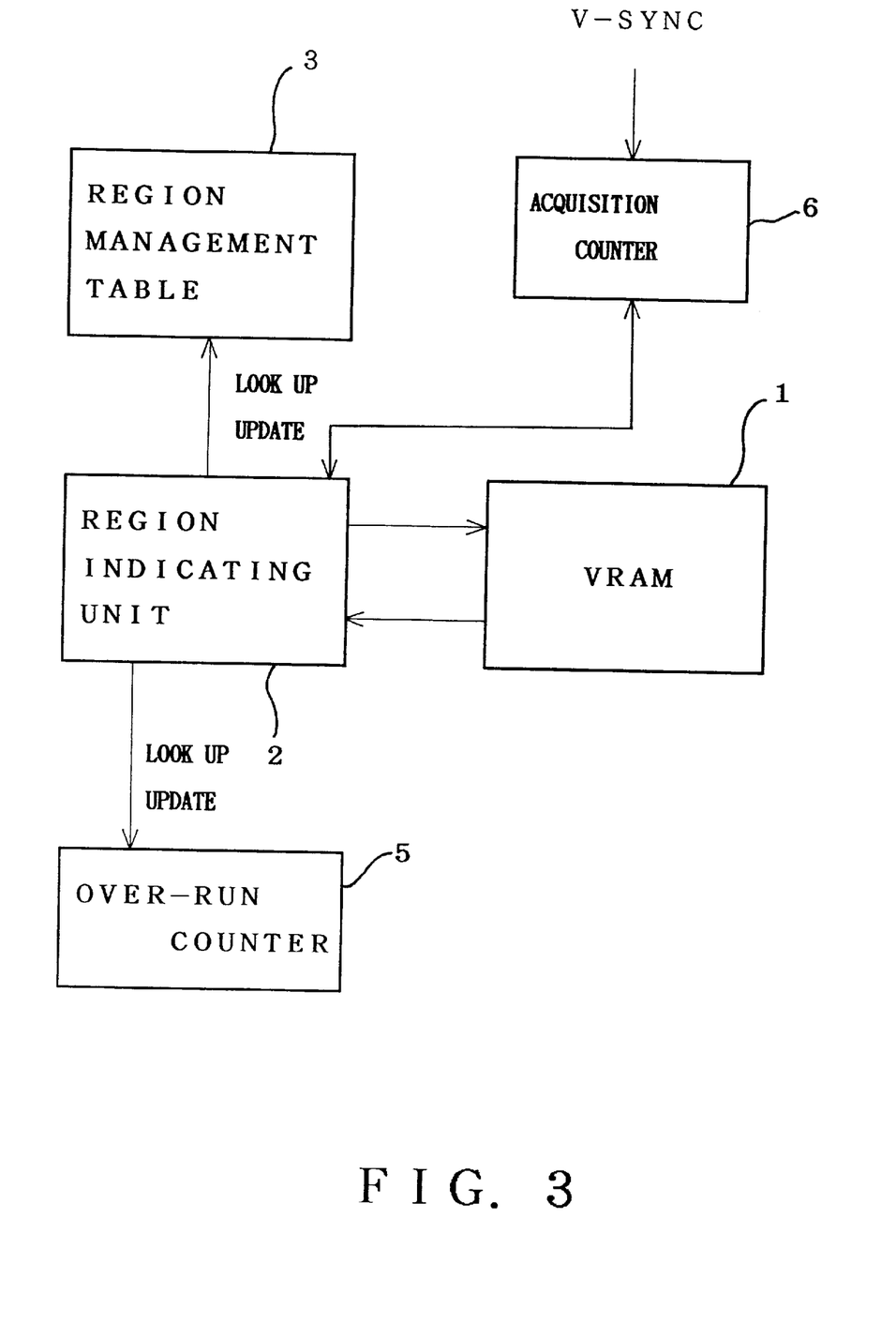
FIG. 3 is a functional diagram showing a mechanism for controlling the digitization processing on an image memory (V-RAM)

Next, a characteristic mechanism of the image data processing device is described with reference to FIG. 3.

In this embodiment, the storing area of the image memory (V-RAM) 1 is partitioned into a plurality of image storing regions.

In addition, the image data processing device sets a region indicating unit 2 on the VRAM control unit 10. The region indicating unit 2 has a function to indicate, in a hardware manner, in which image storing region the processing to be carried out on the image memory (V-RAM) 1 should be carried out.

Figure 7:
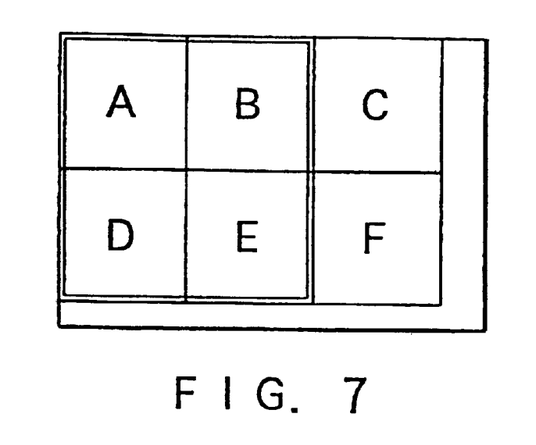
FIG. 7 is an example 1 of an image memory (V-RAM)

An example of the image memory (V-RAM) 1 is shown in FIG. 7. The image memory (V-RAM) 1 according to the present embodiment is partitioned into six regions (A–F). In this event, if the total capacity of the image memory (V-RAM) 1 is equal to 512 dots×256 dots, the capacity of each region is equal to 160 dots×120 dots. In the figure, the region defined by a double line corresponds to a display region on the CRT at the initial state.

Figure 4:
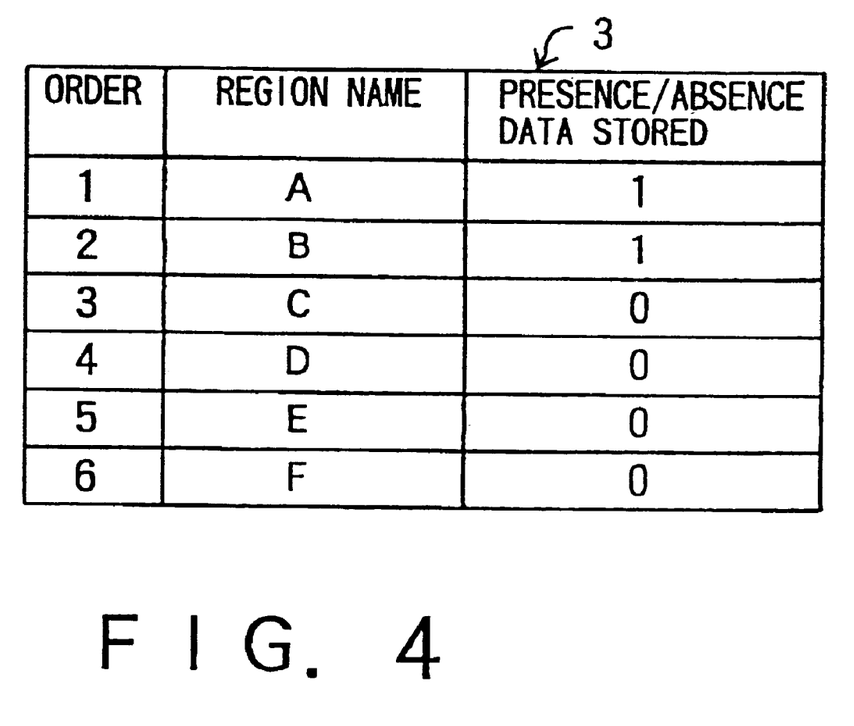
FIG. 4 is a view for use in describing contents of a region management table 3.

The region management table 3 is set in the VRAM control unit 10 or the storage device 4 and has a table structure shown in FIG. 4.

More particularly, the region management table 3 registers the order of the image storing regions (A–F) in the image memory (V-RAM) 1 and a flag of one bit representing whether the data is stored in each image region. The order representing the time of recording of the image data and the higher priority is set to the region in the order stored. It is noted that the region management table 3 in this figure sets the higher priority in the alphabetical order from a region A.

The region management table 3 shown in FIG. 4 indicates that the image data is stored in the region A of the first order and a region B of the second order, as well as that the time of recording of the region A is previous to that of the region B. At that time, the VRAM control unit 10 first reads out from the storage device 4 the image data stored in the region A and then reads out from the storage device 4 the image data stored in the region B. In addition, the region indicating unit 2 indicates a region C, the free region of the highest order, as the storing region for the image data.

The flag of the region management table 3 is updated at the time when digitization of the image data is completed. More particularly, when image data is stored in a given image storing region and digitization of this image data is completed, the flag of the image storing region in question is set into "1."

Next, an acquisition counter 6 is disposed in the video output control unit 13 or the VRAM control unit 10 to count the change of the V-SYNC signal. In order to digitize the image data of 10 frames per second during the V-SYNC signal generates 30 pulses per second in synchronism with the image signal, an image acquisition signal is generated for every three V-SYNC signals.

An over-run counter 5 is a counter indicating how many regions of all regions in the image memory (V-RAM) 1 store the image data. For example, if the state of the image memory (V-RAM) 1 corresponds to the region management table 3 shown in FIG. 4, i.e., if the image data are held only in the regions A and B, a value (NO) of the over-run counter 5 becomes "NO=2."

In this event, the region indicating unit 2 is capable of judging the number of regions in the storing state on the image memory (V-RAM) 1, or the number of free regions. Though the over-run counter 5 is a counter of the incrementing type, it may be a counter of the decrementing type which subtracts the number of regions in the storing state from the total number of regions.

When the value of the over-run counter 5 indicates the value larger than or equal to the number of the image storing regions of the image memory (V-RAM) 1 (i.e., larger than or equal to seven), over-run information is written in to the storage device 4.

Figure 5:
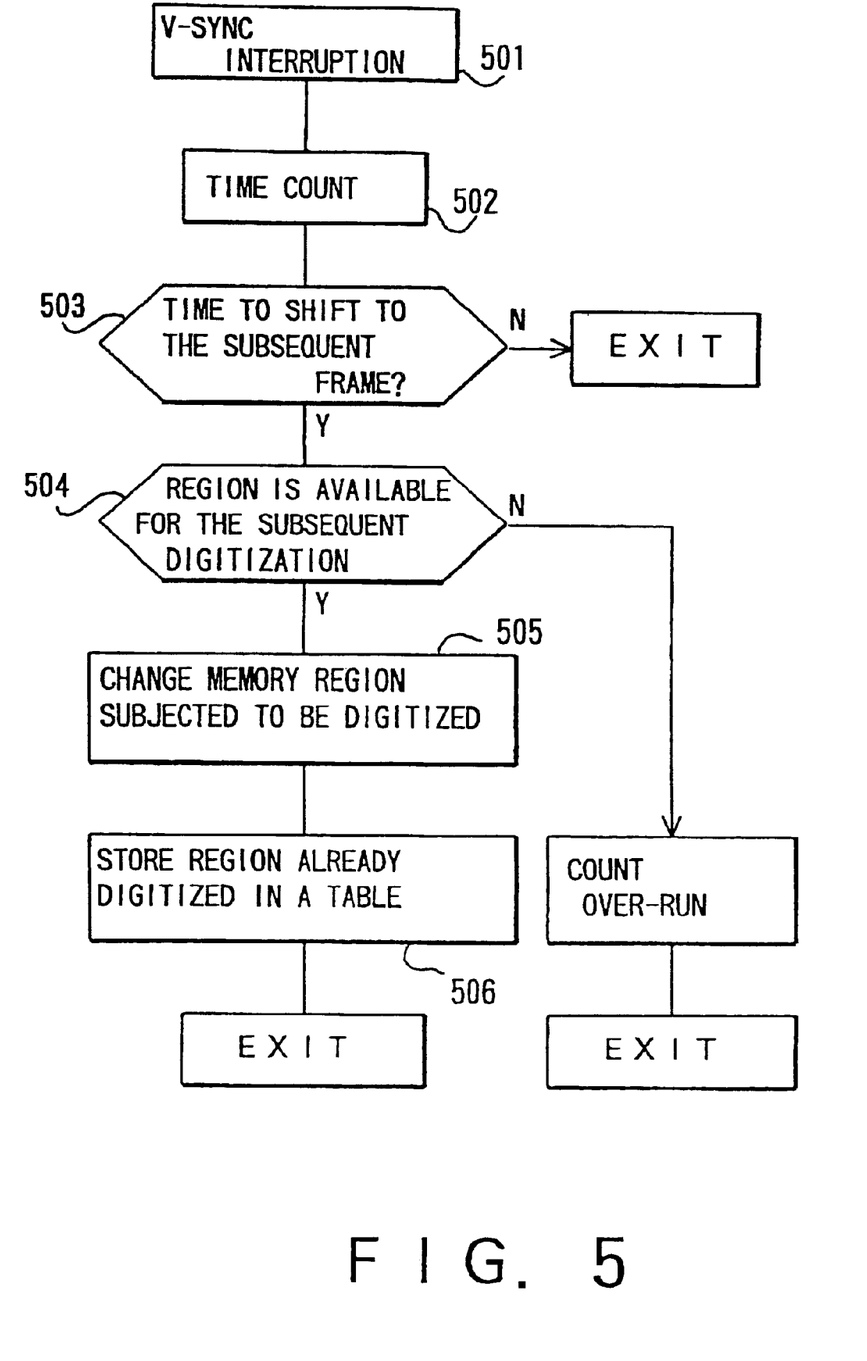
FIG. 5 is a flow chart showing control procedures carried out by a video output control unit 13.

Next, procedures to acquire the image data in the image memory (V-RAM) 1 is described with reference to FIG. 5.

First, the acquisition counter 6 increments a counter value (502) in response to the V-SYNC signal indicating interruption (Step 501). If it becomes counting out (e.g., NC=3) due to this incrementation (503), the acquisition counter 6 indicates the region indicating unit 2 to acquire the subsequent image data (frame).

In this event, the region indicating unit 2 looks up the region management table 3 and the over-run counter 5 to judge whether a region is available for the subsequent digitization, i.e., whether there is a free image storing region on the image memory (V-RAM) 1 (504).

If there is a free image storing region on the image memory (V-RAM) 1, the region indicating unit 2 determines the region subjected to recording processing (for example, the region C in FIG. 4) (505).

The VRAM control unit 10 stores the image data in the image storing region determined by the region indicating unit 2.

On completion of the digitization processing of said image data, the region indicating unit 2 updates the contents of the region management table 3 (506).

Figure 6:
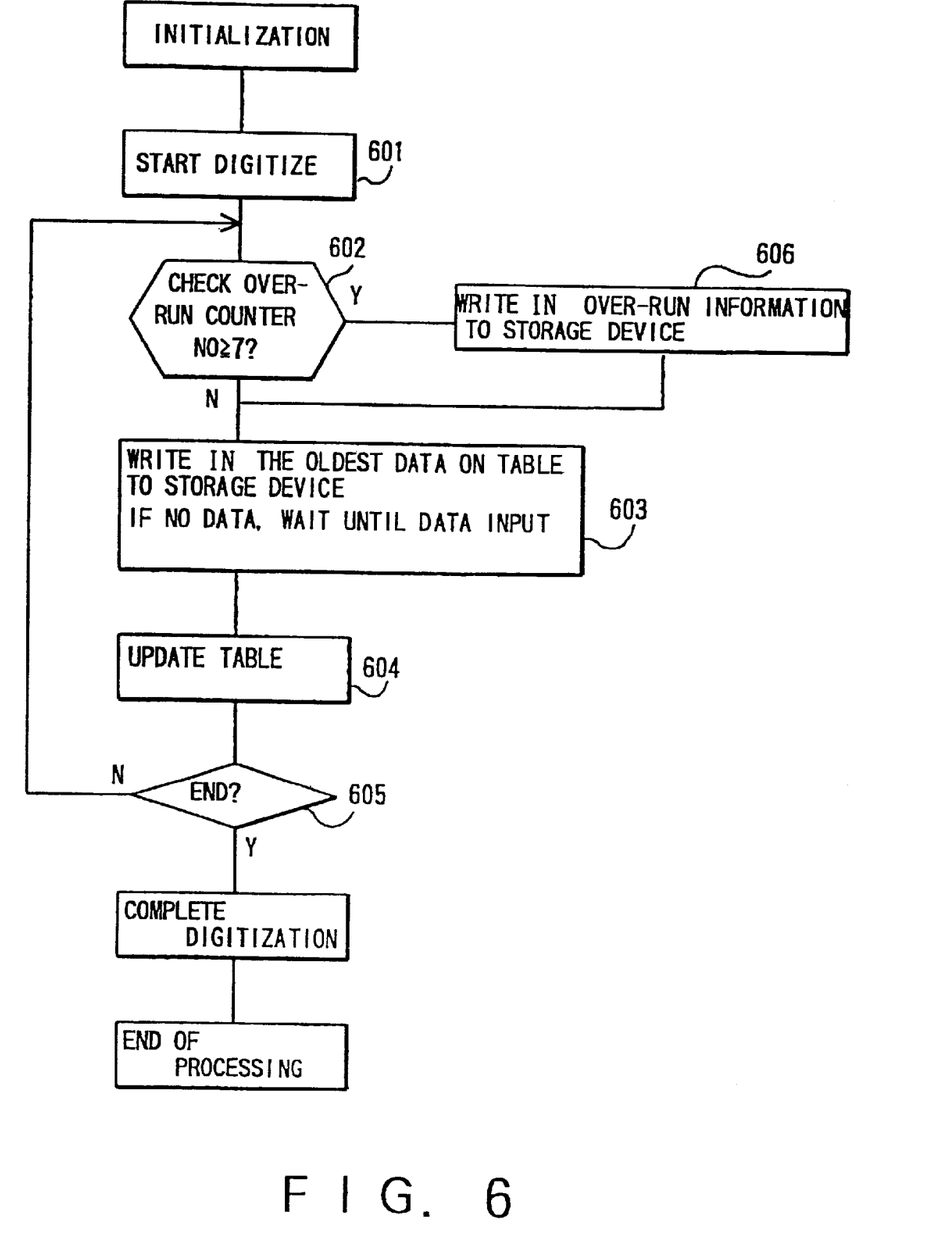
FIG. 6 is a flow chart showing digitization operation.

Next, digitizing processing is described with reference to FIG. 6.

When the digitizing processing begins in response to an instruction from the region indicating unit 2 (601), the over-run counter 5 is checked (602) to check whether it is over-run. If over-run, this over-run information is written to the storage device 4 (606).

Next, the region indicating unit 2 looks up the region management table 3 to indicate the image storing region that stored the image most previously.

The VRAM control unit 10 reads the image data out of the image storing region indicated by the region indicating unit 2 to transfer the same to the main memory (MEM) (603).

In this event, the VRAM control unit 10 transfers the image data in said image storing region to the main memory (MEM) through the bus 11. In addition, the VRAM control unit 10 transfers the image data stored in the main memory (MEM) to the storage device 4 under the control,of the main control unit (CPU).

The image data transferred to the main memory (MEM) in the above manner is transferred to the storage device 4 through the bus 11 under the control of the main control unit (CPU).

At step 603, the VRAM control unit 10 may transfer the image data in the image memory (V-RAM) 1 directly to the storage device 4. If the image data are directly erred from the image memory (V-RAM) 1 to the storage device 4, it becomes possible to store the image data at a high speed without affecting on the main control unit (CPU).

At said step 603, if all image storing regions of the image memory (V-RAM) 1 are in the free state, the VRAM control unit 10 waits until the subsequent image data is stored (603).

On completion of the write-in processing of the image data, the contents of the region management table 3 is updated. More particularly, the flag of the image storing region where the write-in processing is completed is updated from "1" to "0" (604).

The above mentioned processing is repeatedly carried out. The processing is terminated when all image data on the image memory (V-RAM) 1 are transferred to the storage device 4 (605).

Figure 8:
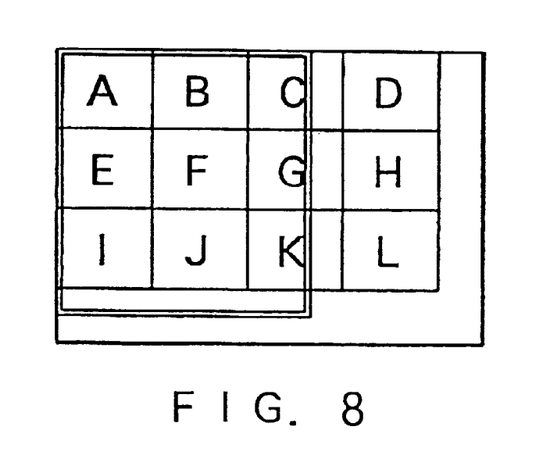
FIG. 8 is an example 2 of an image memory (V-RAM)
Figure 9:
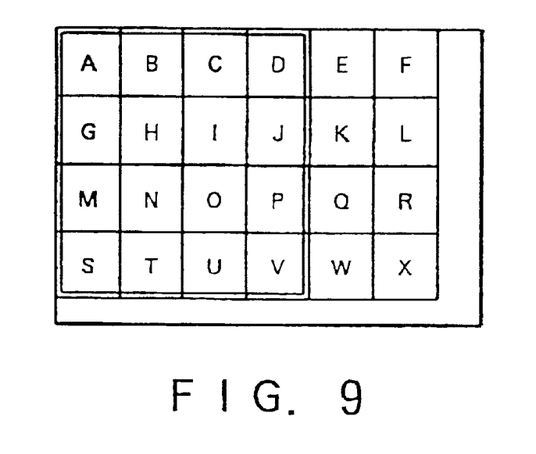
FIG. 9 is an example 3 of an image memory (V-RAM)

While the above mentioned description has thus been made in conjunction with the image memory (V-RAM) 1 partitioned into six regions (A–F) as shown in FIG. 7, it may be partitioned into twelve regions (A–L) as shown in FIG. 8. In this event, the capacity of each region is equal to 106 dots×80 dots. In addition, it may be partitioned into twenty-four regions (A–X) as shown in FIG. 9. In this event, the capacity of each region is equal to 80 dots×60 dots.

It is understood that the increased number of regions partitioned requires the increased value of the region management table 3 and the over-run counter 5.

The present embodiments use the image storing unit 1 (the image memory (V-RAM) 1) partitioned into a plurality of regions as a buffer for digitization to realize the image processing effectively using the limited memory resources.

As the image storing unit according to the present invention, the main memory (MEM) can be used equally with being partitioned into a plurality of regions.

What is claimed is:

1. A controller for an electronic apparatus, wherein the electronic apparatus displays image data stored in a image memory on a display unit, the controller comprising:

an output unit outputting the image data to be displayed and stored in the image memory to the display unit;

a storing controller storing an image data received from an image input device to the image memory; and a transfer unit transferring the image data stored in the image data by the storing controller to a second memory, said memory is divided into regions and the controller outputs, stores, and transfers the image data based upon priority data corresponding to the region storing the image data, said priority data for outputting the image data from the regions is determined by an order in which the regions stored the image data and said priority data for storing the image data to the regions in determined by an order in which the regions output the image data.

2. The controller as recited in claim 1, wherein the storing controller uses the image memory as a buffer memory of the image data from the input device.

3. The controller as recited in claim 1, wherein the image data from the input device is dynamic image data.

4. An electronic apparatus for displays image data on a display unit comprising:

an image memory storing image data to be displayed on the display unit; an output unit outputting the image data to be displayed stored in the image memory to the display unit;

a storing controller storing an image data from an image input device to the image memory;

a second memory storing the image data from the input device; and a transfer unit transferring the image data stored in the image data by the storing controller to a second memory, where said image memory is divided into regions and the storing controller outputs, stores, and transfers the image data based upon priority data corresponding to the region storing the image data, said priority data for outputting the image data from the regions is determined by an order in which the regions stored the image data and said priority data for storing the image data to the regions is determined by an order in which the regions output the image data.

5. The electronic apparatus as recited in claim 4, wherein the storing controller uses the image memory as a buffer memory of the image data from the input device.

6. The electronic apparatus as recited in claim 4, wherein the image data from the input device is dynamic image data.

7. A controller of an electronic apparatus, wherein the electronic apparatus displays image data stored in an image memory on a display unit, the controller comprising:

an output unit outputting the image data to be displayed stored in the image memory to the display unit;

a storing controller, coupled to the output unit, storing to a main memory image data transmitted from an image input device of the electronic apparatus and stored in the image memory by the output unit through the storing controller; and a transfer unit, coupled to the storing controller through a bus, transferring the image data stored in the main memory by the storing controller to a third memory, wherein said image memory is divided into regions and the storing controller outputs, stores, and transfers the image data based upon priority data corresponding to the region storing the image data, said priority data for outputting the image data from the regions is determined by an order in which the regions stored the image data and said priority data for storing the image data to the regions is determined by an order in which the regions output the image data, and wherein the storing controller is coupled to the image memory and is coupled to the main memory and the third memory through the bus.

8. The controller as recited in claim 7, wherein the storing controller uses the main memory as a buffer memory of the image data from the input device.

9. The controller as recited in claim 7, wherein the image data from the input device is dynamic image data.

10. The controller as recited in claim 7, wherein the main memory is for information processing apparatus.

11. An electronic apparatus for displaying image data on a display unit, said apparatus comprising:

a main memory;

an image memory storing image data to be displayed on the display unit;

an output unit outputting the image data to be displayed stored in the image memory to the display unit;

a storing controller, coupled to the output unit, storing image data transmitted from an image input device to the image memory and to the main memory;

a third memory storing the image data from the image input device; and a transfer unit, coupled to the storing controller through a bus, transferring the image data stored in the main memory by the storing controller to the third memory, wherein said image memory is divided into regions and the storing controller outputs, stores, and transfers the image data based upon priority data corresponding to the region storing the image data, said priority data for outputting the image data from the regions is determined by an order in which the regions stored the image data and said priority data for storing the image data to the regions is determined by an order in which the regions output the image data, and wherein the storing controller is coupled to the image memory and is coupled to the main memory and the third memory through the bus.

12. The electronic apparatus as recited in claim 11, wherein the storing controller uses the main memory as a buffer memory of the image data from the input device.

13. The electronic apparatus as recited in claim 11, wherein the image data from the input device is dynamic image data.

14. The electronic apparatus as recited in claim 11, wherein the main memory is for an information processing apparatus.

* * * * *

UNITED STATES PATENT AND TRADEMARK OFFICE
CERTIFICATE OF CORRECTION

PATENT NO.    : 6,243,108 B1
DATED         : June 5, 2001
INVENTOR(S)   : Shushi Takiyama et al.

It is certified that error appears in the above-identified patent and that said Letters Patent is hereby corrected as shown below:

<u>Title page,</u>
Item [30], add Priority Data -- Japan    4-294661    2/11/1992 --.

<u>Column 7,</u>
Line 19, change "a" to -- an --.
Line 23, delete "an".
Line 26, change "data" to -- memory --.
Line 27, insert -- wherein -- before "said".
Line 27, insert -- image -- after "said".
Line 33, change "in" to -- is --.
Line 43, insert a hard return (new paragraph) after "unit".
Line 51, change "data" to -- memory --.
Line 52, change "where" to -- wherein --.

Signed and Sealed this

Second Day of April, 2002

*Attest:*

JAMES E. ROGAN
*Attesting Officer*    *Director of the United States Patent and Trademark Office*